United States Patent
Neininger et al.

(10) Patent No.: US 11,052,598 B2
(45) Date of Patent: Jul. 6, 2021

(54) METHOD FOR PRODUCING AND SURFACE TREATMENT OF A MOLDED PART

(71) Applicant: DyeMansion GmbH, Planegg (DE)

(72) Inventors: Markus Neininger, Munich (DE); Felix Ewald, Munich (DE); Philipp Kramer, Munich (DE)

(73) Assignee: DYEMANSION GMBH, Planegg (DE)

( * ) Notice: Subject to any disclaimer, the term of this patent is extended or adjusted under 35 U.S.C. 154(b) by 558 days.

(21) Appl. No.: 15/925,232

(22) Filed: Mar. 19, 2018

(65) Prior Publication Data

US 2018/0207873 A1    Jul. 26, 2018

Related U.S. Application Data

(63) Continuation of application No. PCT/EP2016/072157, filed on Sep. 19, 2016.

(30) Foreign Application Priority Data

Sep. 18, 2015 (DE) .................... 10 2015 115 821.3

(51) Int. Cl.
*B29C 64/35* (2017.01)
*B29C 71/00* (2006.01)
(Continued)

(52) U.S. Cl.
CPC ............ *B29C 64/135* (2017.08); *B29C 64/40* (2017.08); *B29C 71/0009* (2013.01);
(Continued)

(58) Field of Classification Search
CPC ...... B29C 64/35; B29C 64/40; B29C 71/0009
See application file for complete search history.

(56) References Cited

U.S. PATENT DOCUMENTS

| 3,807,054 A | 4/1974 | Joseph et al. |
| 5,216,616 A * | 6/1993 | Masters ................. B29C 35/08 |
| | | 264/401 |

(Continued)

FOREIGN PATENT DOCUMENTS

| DE | 102007048385 B3 | 1/2009 |
| DE | 102010001101 A1 | 7/2011 |

(Continued)

OTHER PUBLICATIONS

First German Office Action with an English translation issued for German Patent Application No. 10 2015 115 821.3 dated May 9, 2016.

(Continued)

*Primary Examiner* — Jacob T Minskey
*Assistant Examiner* — Virak Nguon
(74) *Attorney, Agent, or Firm* — Myers Wolin, LLC

(57) ABSTRACT

A method is provided for treating a surface of a molded part, produced in a 3D printing method, with a surface treatment means, wherein holding means are arranged on the molded part which enable a treatment of the surface in a treatment chamber, without the surface making contact with the walls of the treatment chamber. A corresponding method for producing a molded part in a 3D printing method is also provided, as well as the corresponding dataset for controlling a 3D printer, and a computer program product which determines a number of holding means on the basis of the geometry data of the molded part.

16 Claims, 4 Drawing Sheets

(51) Int. Cl.
  *B33Y 40/00* (2020.01)
  *B29C 64/40* (2017.01)
  *G05B 19/4099* (2006.01)
  *B33Y 10/00* (2015.01)
  *B33Y 30/00* (2015.01)
  *B29C 64/135* (2017.01)

(52) U.S. Cl.
  CPC .......... *B33Y 40/00* (2014.12); *G05B 19/4099* (2013.01); *B33Y 10/00* (2014.12); *B33Y 30/00* (2014.12)

(56) References Cited

U.S. PATENT DOCUMENTS

| | | | |
|---|---|---|---|
| 2005/0173838 A1* | 8/2005 | Priedeman, Jr. | B33Y 10/00 264/401 |
| 2010/0244301 A1* | 9/2010 | Ederer | B05C 3/005 264/45.6 |
| 2010/0270707 A1 | 10/2010 | Priedeman, Jr. et al. | |
| 2012/0018115 A1* | 1/2012 | Hovel | B22F 5/003 164/493 |
| 2012/0018926 A1* | 1/2012 | Mannella | B29C 64/165 264/500 |
| 2013/0075957 A1* | 3/2013 | Swanson | B29C 64/40 264/405 |
| 2014/0300017 A1* | 10/2014 | Wighton | B29C 64/141 264/40.1 |
| 2015/0145171 A1* | 5/2015 | Walker | B29C 64/40 264/401 |
| 2017/0050387 A1* | 2/2017 | Ederer | B29C 64/40 |
| 2017/0274455 A1* | 9/2017 | Herzog | B22F 3/1055 |

FOREIGN PATENT DOCUMENTS

| | | |
|---|---|---|
| DE | 102010052367 A1 | 5/2012 |
| GB | 255144 A | 11/1924 |
| GB | 2520596 A | 5/2015 |
| WO | 2007138619 A1 | 12/2007 |

OTHER PUBLICATIONS

Second German Office Action with an English translation issued for German Patent Application No. 10 2015 115 821.3 dated Nov. 20, 2017.

International Search Report issued for corresponding International Patent Application No. PCT/EP2016/072157 dated Jan. 3, 2017.

International Preliminary Report on Patentability issued for corresponding International Patent Application No. PCT/EP2016/072157 dated Mar. 20, 2018.

Communication according to Article 94 (3) EPC issued by the European Patent Office for corresponding European Patent Application No. 16 778 226.7, dated Sep. 22, 2020, with English translation attached.

* cited by examiner

METHOD FOR PRODUCING AND SURFACE TREATMENT OF A MOLDED PART

CROSS REFERENCE TO RELATED APPLICATIONS

This application is a continuation of International Application No. PCT/EP2016/072157, filed on Sep. 19, 2016, which claims priority to German Application No. 10 2015 115 821.3, filed Sep. 18, 2015, the contents of each of which are incorporated by reference herein.

TECHNICAL FIELD

The invention relates to a method for producing and for surface treatment of a molded part, which is produced in a 3D printing process, in particular, in a powder based production and printing process, respectively.

BACKGROUND

It is known to produce molded parts in a 3D printing process. With 3D printing processes, purely additive production processes are meant. In prior art, the surfaces of the molded parts produced in a 3D printing process preferably are treated or processed manually in order to obtain a smooth surface. Namely, the molded parts produced in the 3D printing process, in particular, in case powder-based printing processes are used, usually have a coarse surface due to the manufacturing process, leading in many cases to a negative influence of the haptic impression by the user of the molded part.

In order to make the surface treatment more efficient, in particular, the smoothening of the surface of the molded part, it is known to put the molded parts to be processed into a container, into which an etching agent is also introduced. By bringing the surface of the molded part into contact with the etching agent, a smoothening of the surface is achieved. With respect to this method, also several molded parts to be processed may be put into the container.

The etching process known from prior art, however, has the disadvantage that the molded parts to be processed rest at least partially on the bottom of the container, or are lying against the side wall of the container at least partially, or several molded parts to be processed contact each other.

At the spots, where the molded parts are lying on the bottom or at the side wall or where several molded parts contact each other, no or only insufficient etching agent reaches the surface of the molded part, resulting in one or more portions of the surface of the molded part not being smoothened, or only being smoothened insufficiently. The surface of the molded parts to be processed, therefore, still have coarse portions after the etching process, which significantly are distinguished from the smoothened portions optically as well as haptically. This requires a manual post-processing of the surface of the molded parts.

A further disadvantage is that the surface of the molded parts becomes smooth or is softened during the etching process. This may result in the molded parts being flattened or even changing their shape at the spots, where they contact the bottom and/or the sidewall of the container, which is not desirable. FIG. 8 shows a molded part before 41 and after 42 an etching process, which has been carried out according to a method known from prior art, with the molded part resting on the bottom 40 of a container. Here, it can be seen that the underside of the molded part 42 is flattened after the etching procedure. The flattened spots usually have to be post-processed manually. Further, molded parts contacting each other tend to adhere to each other, and often have to be separated after the etching process manually, and also have to be post-processed.

For a series production, however, such a manual post-processing of the molded parts is not suitable. Moreover, when manually post-processing the surface portions, which are still coarse and possible flattened, it may not be ensured that the entire surface is formed consistently smooth or has a uniform surface structure.

Therefore, the present invention is based on the object to provide solutions allowing for surfaces of molded parts, in particular, molded parts produced in a 3D printing process, to be treated more efficiently, in particular, to smooth them more efficiently, whereby the solutions should also enable a more efficient serial production.

SUMMARY

This object is solved by a method for treating a surface of at least one molded part produced in a 3D printing process, in particular, in a powder-based production and printing process, with an etching agent, as well as by a method for producing a molded part in a 3D printing process, which has to be subjected to a surface treatment after the production, according to the independent claims. Preferred embodiments and further developments can be derived from the respective dependent claims. By 3D printing processes, pure additive production processes are meant.

Accordingly, a method for treating a surface of at least one molded part produced in a 3D printing process (additive production process), in particular, in a powder-based production and printing process, with a surface treatment agent, is provided wherein at least one holding means projecting from the surface is arranged at the surface of the molded part, the molded part with the at least one holding means is introduced into a processing chamber having an inner wall formed by a bottom wall and side walls of a processing device such that the surface of the molded part does not contact the inner wall, after having been introduced into the processing chamber for a predetermined time period, the surface treatment agent is applied to the surface of the molded part, and after the application of the surface treatment agent to the surface of the molded part, the molded part is removed from the processing chamber, and the holding means is detached from the surface of the molded part.

The application of the surface treatment agent to the surface of the molded part may comprise a vapor deposition of the surface treatment agent on the surface, spraying the surface treatment agent onto the surface, an immersion of the molded part into a liquid surface treatment agent, and combinations thereof.

During the application of the surface treatment agent, the molded part may be moved within the processing chamber relative to the processing chamber, in particular, may be rotated.

After the application of the surface treatment agent to the surface of the molded part, the molded part may be subjected to cleaning, in order to remove excessive surface treatment agent present on the surface of the molded part, for example, by neutralizing acid present at the surface with an alkaline solution, wherein the molded part is heated for cleaning, in order to release the excessive surface treatment agent from the surface of the molded part and/or wherein the molded part is heated prior and/or during the application of the surface treatment agent to the surface, in order to reduce the treatment duration of the surface treatment.

The holding means may comprise at least one holding pin having at least two ends, wherein at least one end of the holding pin is attached to the surface of the molded part.

The holding means may comprise a lattice box wherein the molded part is arranged within the lattice box such that at least one end of the holding pin is attached to the surface of the molded part, and at least another end of the holding pin is attached to the wall of the lattice box, whereby the surface of the molded part does not contact the lattice box.

The holding means may comprise at least one spacer having two ends, wherein several molded parts are arranged spaced apart from each other and not contacting each other, wherein the several molded parts are connected to each other via the at least one spacer.

The several molded parts may be arranged within the lattice box.

The holding means and the molded part may be formed in one piece and/or may be produced in the 3D printing process in one piece.

It is preferable that the holding pin of the holding means is arranged relative to the surface of the molded part such that the holding pin lies outside of an imaginary convex shell of the molded part at least in sections.

A predetermined breaking point may be formed between the surface of the molded part and the holding means, at which, after the application of the etching agent to the surface of the molded part, the holding means may be released from the molded part.

A minimum cross-sectional area of the holding means at the portion facing the surface of the molded part may be selected depending on the weight of the molded part, on the surface treatment duration, on the surface treatment agent used, on the production process, on the material used, and/or combinations thereof.

It is preferable, if
  the at least one molded part comprises a first material or a first material composition, and the at least one holding means comprises a second material or a second material composition,
  for detaching the holding means from the surface of the molded part, a preferably liquid separation means is applied at least to the holding means, wherein the separation means is selected such that the holding means partly is dissolved within a predetermined time period completely without thereby modifying, in particular, without damaging the molded part or the surface of the molded part.

It has been found to be advantageous, if the molded part is produced in a powder based production or printing process, the first material or the first material composition comprises a first adhesive, and the second material or the second material composition comprises a second adhesive, wherein the first adhesive is resistant with respect to the second adhesive, and the second adhesive is non-resistant with respect to the separation means.

Further, a method for producing a molded part in a 3D printing process, in particular, in a powder-based production of printing process, is provided, which has to be subjected to a surface treatment with a surface treatment agent after the production, wherein the molded part is produced together with at least one holding means projecting from the surface of the molded part, wherein the molded part and the at least one holding means are formed in one piece.

The holding means may project at least partially beyond an imaginary convex shell of the molded part.

The holding means may be produced as a spacer, wherein a spacer connects at least two molded parts spaced apart from each other, wherein the spacer is also produced in a 3D printing process such that the spacer and the molded parts are formed in one piece.

The holding means may be produced as a lattice box with at least one holding pin, wherein the molded part is produced within the lattice box, and wherein the molded part is fixed to the lattice box by means of the at least one holding pin, wherein the at least one holding pin is also produced in the 3D printing process such that the lattice box, the at least one holding pin, and the molded part are formed in one piece.

For the production of the molded part, a first material or a first material composition may be used, and for producing the holding means, a second material or a second material composition may be used, wherein the first material or the first material composition and the second material or the second material composition are selected such that the holding means are dissolvable by means of a preferably liquid separation means within a predetermined time period completely without thereby modifying, in particular, damaging the molded part or the surface of the molded part.

The surface treatment agent may comprise an etching agent and/or a solvent.

Further, a data set for controlling a 3D printer for producing a three-dimensional molded part is provided, which is to be subjected to a surface treatment with a surface treatment agent after the production, whereby the data set comprises first and second instructions being interpretable by the 3D printer, according to which the 3D printer produces the molded part, wherein
  the first instructions comprise information on the geometry of the molded parts to be produced, and
  the second instructions comprise information on the geometry of the at least one holding means to be produced,
wherein the second instructions are selected such that the at least one holding means is produced as a holding means projecting from the surface of the molded part, and is produced in one piece with the molded part.

The second instructions may be selected such that
  the holding means is produced as a holding means projecting at least partially beyond an imaginary convex shell of the molded part, and/or
  the holding means is produced as a lattice box enclosing the molded part, wherein the molded part is fixed to the lattice box by means of holding pins produced by the 3D printer, and/or
  spacers are produced, which connect the at least two molded parts spaced apart from each other to each other and not contacting each other, wherein the molded parts and the spacers may be produced in one piece.

Further a computer program product is provided, in particular, a computer application, which may be loaded into the memory of a computer, and which may be executed on the computer for the production of a data set interpretable by a 3D printer for producing at least one three-dimensional molded part, wherein the computer program product comprises program sections being adapted to
  determine a number of holding means based on geometry data of the at least one molded part, which project from the surface of the molded part, and/or connect at least two molded parts to each other spaced apart from each other and not contacting each other, wherein the holding means and the at least one molded part are formed in one piece, determine a cross section and/or a length and/or a position at the surface of the molded part and/or a shape for each holding means determined, and generate instructions interpretable for the 3D printer for the thus determined holding means, and to insert them into the data set.

BRIEF DESCRIPTION OF THE DRAWINGS

Further details and features of the invention can be derived from the following description in connection with the drawing, in which.

DETAILED DESCRIPTION

The molded parts to be processed are produced in a generative production method or in an additive production process (3D printing process). The surface of the molded part produced has imperfections due to production, which facilitate the adherence of dirt or contaminations at the surface of the molded part. With respect to powder based 3D printing processes, moreover, a powder surrounding the molded part may remain adhered to the surface of the molded part, or may be fused with the surface, also resulting in a coarse surface. The coarse or porous surface of the molded part, moreover, negatively affects the haptic of the molded part.

Therefore, it is provided for the surface of a molded part having been produced in a 3D printing process being smoothened, in particular, by using a surface treatment agent, as an etching agent or a suitable solvent. The surface treatment agent to be used basically depends on the material or the materials, from which the molded part has been made.

Figure 1:
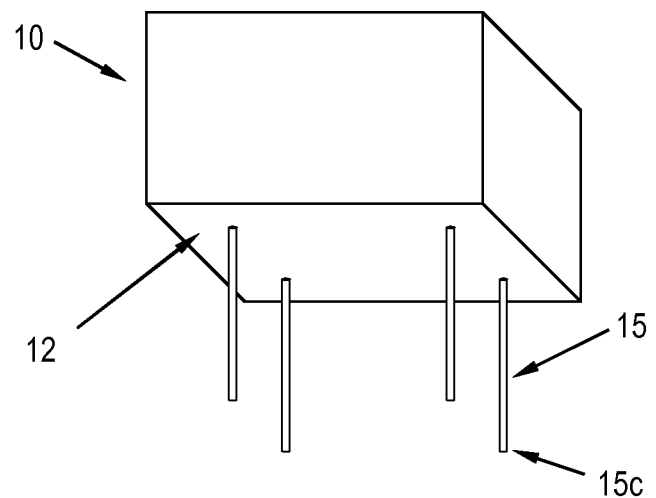
FIG. 1 shows a molded part produced according to the invention in a 3D printing process.

FIG. 1 shows a molded part 10, which has been produced according to the method for producing a molded part in a 3D printing process.

The molded part 10 comprises a surface 12 to be treated, i.e., to be smoothened.

Holding means 15 are arranged at the molded parts 10 or at the surface 12 of the molded part 10, which here are configured as holding pins. Alternatively or additionally, also holding means being configured as spacers may be provided, as explained with reference to FIG. 4, FIG. 6, and FIG. 7

The holding pins 15 are dimensioned such that the latter are able to support the molded parts 10, when the molded part 10 is put on a surface with the or on the holding pins 15. Thus, for example, it is possible to put the molded part 10 in a processing chamber of an etching device such that only the ends 15c of the holding pins 15 facing away from the surface 12 of the molded part 10 contact a bottom of the processing chamber. Thereby, the molded part 10 or the surface 12 of the molded part is prevented from resting on the bottom of the processing chamber of the etching device, thereby preventing the surface 12 of the molded part 10 from comprising areas or portions, which have not or only insufficiently been smoothened after the etching procedure. Moreover, thereby the geometry of the molded part is prevented from being modified, for example, by creating flattened areas, if the surface of the molded part becomes soft or is softened during the etching procedure.

Moreover, the holding pins 15 are dimensioned such that the connection points, at which the holding pins 15 are arranged at the surface 12 of the molded part 10, comprise a preferably small cross-sectional area. For example, the holding pins may comprise a cross-sectional area at portion facing the surface of the molded part, which is smaller than 5 mm$^2$, preferably smaller than 2 mm$^2$, particularly preferred smaller than 1 mm$^2$. The cross-sectional area as listed above only represent exemplary cross-sectional areas, but nevertheless are advantageous. The dimensions of the holding pins 15 are selected depending on the weight of the molded part, on the surface treatment duration, and/or on the surface treatment agent used. Thus, for example, for very light-weight molded parts, holding pins having very small cross-sectional areas may be provided.

The holding pins 15, after the etching process and, if needed, after a drying process, are detached from the surface 12 of the molded part 10 such that only the very small connection points remain as untreated portions of the surface 12. These very small connection points neither optically nor haptically have a negative effect. Namely, the material used for the production of the molded part is perfectly molded or bonded at the connection points anyway during the production such that due to the detaching of the holding means 15 from the surface 12 of the molded part 10, in fact, untreated connection points remain, these, however, are smooth anyway due to the melting or bonding of the material during the production. A surface treatment of the connection points, therefore, is not necessary.

For example, in the holding means 15 may be cut, for example, by means of a knife or a blade.

According to a preferred embodiment of the invention, the process for detaching or removing the holding means 15 from the molding part 10 is performed with a preferably liquid separation means. This, for example, may be carried out by immersing the molded part with the holding means arranged thereon for a predetermined time into the liquid separation means. As separation means, for example, a solvent may be used.

The separation means causes the holding means to at least partially dissolve. In order to ensure a dissolving of the holding means in the separation means without affecting the molded part and/or its surface, it is advantageous, if the holding means are produced from a material or a material composition, which is or are different from the material or material composition of the molded part.

The material or the material composition of the molded part is selected depending on the separation means used such that it is resistant against the separation means. The material or the material composition of the holding means, on the other hand, is selected such that it is non-resistant against the separation means, and thus can be dissolved in the separation means. Vice versa, also the separation means may be selected depending on the materials used such that it is able to dissolve the holding means, while the molded part is not affected by the separation means.

If the molded part and the holding means arranged thereon are produced in a powder based 3D printing process, the same powder material may be used for the holding means as for the molded part, as far as the production takes place by using an adhesive. In order to ensure a dissolving of the holding means in the separation means without the molded part being affected, it is provided for using another adhesive for the holding means than for the molded part. Preferably, for the molded parts, an adhesive is used being resistant against the separation means, while for the holding means, an adhesive is used being non-resistant against the separation means.

According to an embodiment of the invention, the holding pins may also be configured such that the molded part may be suspended in the processing chamber of an etching device together with them, without the molded part 10 contacting the bottom or the interior wall of the processing chamber. According to a further alternative embodiment, receiving means may be provided in the processing chamber, which receive the ends of the holding pins 15 facing away from the surface 12 of the molded part 10. For example, blind holes may be provided at the bottom of the processing chamber, into which the holding pins may be fitted or inserted.

In FIG. 1, straight holding pins 15 having two ends are shown. Alternatively to this, also curved holding pins may be provided. Further, also holding pins may be provided having more than two ends, for example, holding pins having the shape of a T-profile, which has three ends. According to an embodiment, it is substantial that the holding pins are attached with at least one end to the surface of the molded part. A further possible configuration of a holding means or a holding pin is shown with reference to FIG. 2.

After the molded part has been introduced into the processing chamber, the etching agent is applied to the molded part, which may take place, for example, by means of vapor deposition on the surface, or by means of immersing the molded part into a liquid etching means. Moreover, the etching device may be configured such that the molded part 10 may be moved, for example, rotated during the surface treatment in the processing chamber. The moving of the molded part in the processing chamber, hereby, is carried out such that the surface 12 of the molded part does not contact the bottom or the interior wall of the processing chamber. In particular, during vapor deposition of the etching agent onto the surface, the moving of the molded part within the processing chamber ensures a uniform vapor deposition on the surface, and thereby a uniform smoothening of the surface.

In FIG. 1, the molded part is shown with four holding means arranged at the surface 12. Depending on the geometry of the molded part 10, also more or less than four holding means or holding pins may be provided.

It is provided that the holding means and the molded part are formed in one piece or integrally, and are produced in one piece or integrally in the 3D printing process. This means that the molded part is produced or printed together with the holding means arranged thereon. Hereby, it may be preferable, if the holding means or the holding pins are provided at those areas of the surface 12 of the molded parts 10, which represent optically less exposed areas. Such optically less exposed areas, for example, may be depressions at the surface of the molded part, as shown in FIG. 2.

Since the molded part is produced or printed together with the holding means or holding pins, the molded part may be supplied to the etching process immediately after the printing without further preparation measures. An arrangement of the holding means or holding pins after the printing of the molded part 10 thus, can be omitted completely.

For printing or producing the molded part with the holding means or holding pins arranged thereon, it is provided for providing a data set or a printing file to the 3D printer, wherein the data set or the printing file comprises instructions or information on the geometry of the molded part and on the geometry of the holding means. The data set itself may be produced by means of a conventional CAD program or 3D design/modelling program being adapted to create a data set readable or interpretable by the 3-D printer. According to an embodiment, the program may be adapted to automatically create holding means based on the geometry of the molded part, and to add these to the data set. According to a further alternative embodiment, the 3D printer may be adapted to calculate suitable holding means for a data set, which only comprises information on the geometry of the molded part, and to print these together with the molded part. These embodiments provide the advantage that the developer or designer of a molded part does not have to consider, where holding means have to be arranged on the molded part and how many.

Figure 2:
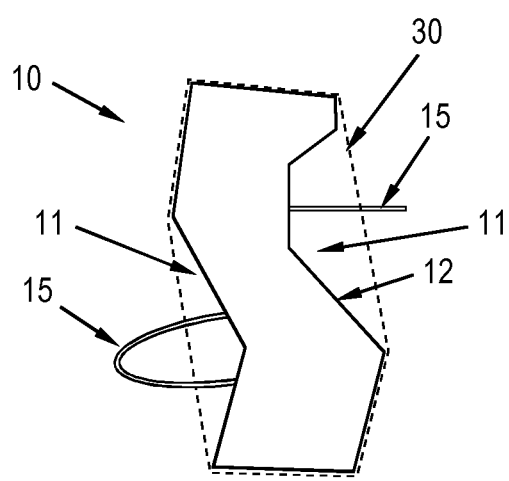
FIG. 2 shows a cross-section of a molded part with an imaginary convex shell.

FIG. 2 shows a cross section of a molded part 10, which comprises a depression or a recess 11 or a concave-shaped surface portion. As far as the holding means or a holding pin 15 is to be arranged at the surface 12 of this recess 11, it is provided for the holding pin being arranged relative to the surface of the molded part and being dimensioned such that the end of the holding pin facing away from the surface lies outside of an imaginary convex shell 30 of the molded part. This arrangement is particularly preferred, if the recess or depression 11 forms an optically less exposed portion of the molded part 10. By the projection of the holding pin 12 at the imaginary convex shell 30, moreover, it is ensured that, for example, during putting the molded part 10 into the processing chamber on the pins 15, the surface of the molded parts does not contact the bottom.

According to a further embodiment, the holding means or the holding pin 15 may also be curved, wherein the holding means is fixed to the surface of the molded part with both ends. If both ends are arranged within the recess or within the concave-shaped surface portion, then the holding means is to be dimensioned such that it at least in portions runs outside of the imaginary convex shell 30.

Figure 3:
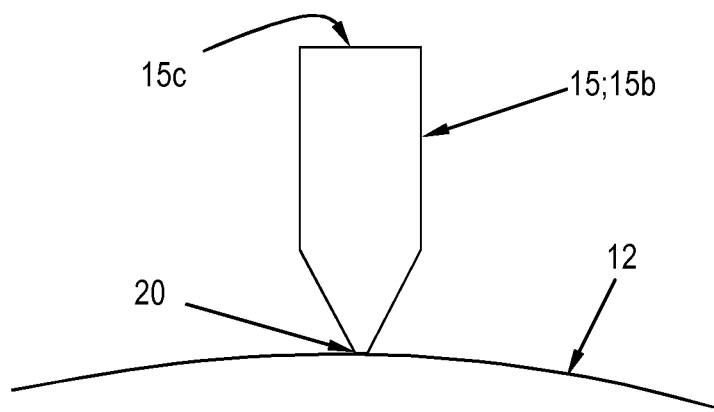
FIG. 3 shows a holding means (holding pin) arranged at the surface of a molded part in an enlarged view.

FIG. 3 shows a portion of a surface 12 of a molded part with a holding pin 15 arranged thereon in an enlarged view.

It may be advantageous, if the holding pin is tapered at the end facing the surface 12 such that the holding pin itself has sufficient stability, and at the same time, the spot, at which the holding pin is attached to the surface has a minimum cross-sectional area. If several holding means or holding pins are arranged at the surface of the molded part 10, the cross-sectional area may be even further reduced at the contact point between the holding pin and the surface of the molded part.

A predetermined breaking point 20 between the surface of the molded part and the holding means may be provided, or to form a predetermined breaking point 20 at this spot during the printing of the molded part with the holding pins. Thereby, the removal of the holding means or the holding pins after the etching process may be facilitated.

Figure 4:
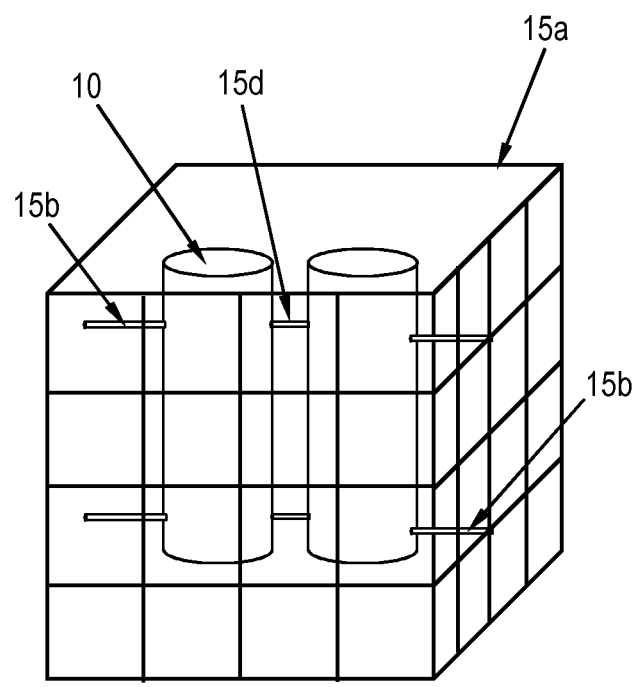
FIG. 4 shows two molded parts arranged in a holding means formed as a lattice box.
Figure 6:
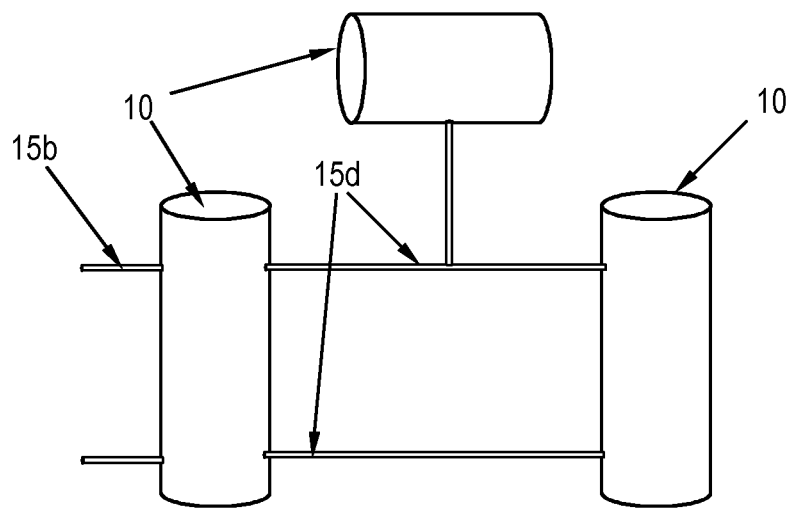
FIG. 6 shows two molded parts, which are connected to each other by means of a spacer.

The embodiment of the portion of the holding means 15 facing the surface 12 of the molded part shown in FIG. 3 may preferably be also provided for the spacer 15d of FIG. 4 and FIG. 6. Accordingly, the portions of the spacers 15d facing the surfaces may also be tapered, and predetermined breaking points may also be provided, if needed.

FIG. 4 shows a preferred embodiment of a holding means which is particularly suitable for arranging several molded parts 10 in a processing chamber of an etching device without the molded parts contacting the bottom or the interior walls of the processing chamber, and without the molded parts contacting each other. If several molded parts are simultaneously subjected to an etching process, it also has to be ensured that the molded parts do not contact each other in order to prevent untreated portions at the surface remaining at the contact points between the molded parts, and to prevent that at the contact point, molded parts contacting each other melt together. A melting may occur, because the surface may be softened by the etching agent used.

In the embodiment shown in FIG. 4, the holding means comprises a lattice box 15a with holding pins 15b arranged thereon. The molded parts 10 are arranged within the lattice box 15a, and particularly such that the molded parts 10 are completely within the delimiting surfaces of the lattice box 15a. By means of the holding pins 15b arranged at the lattice box 15a and reaching into the interior of the lattice box, the molded parts 10 are maintained at a predetermined position within the lattice box.

Moreover, spacers 15d are arranged between two molded parts 10, which respectively are connected at both sides to a molded part. A spacer 15d may be configured such that more than two molded parts 10 are held spaced apart from each other within the lattice box. Such a spacer 15d formed as a T-profile is shown in FIG. 6. One molded part 10 is respectively attached to the three ends of the T-profile-shaped spacer.

The number of the holding pins 15b to be provided and the number of the spacers 15d to be provided depend on the number of the molded parts arranged in the lattice box and on the geometry of the individual molded parts, wherein several molded parts may be arranged within the lattice box, which respectively have a different geometry.

In the example shown in FIG. 4, only the bars of the lattice of the front side wall and the right side wall of the lattice box are shown for reasons of clarity.

Figure 5:
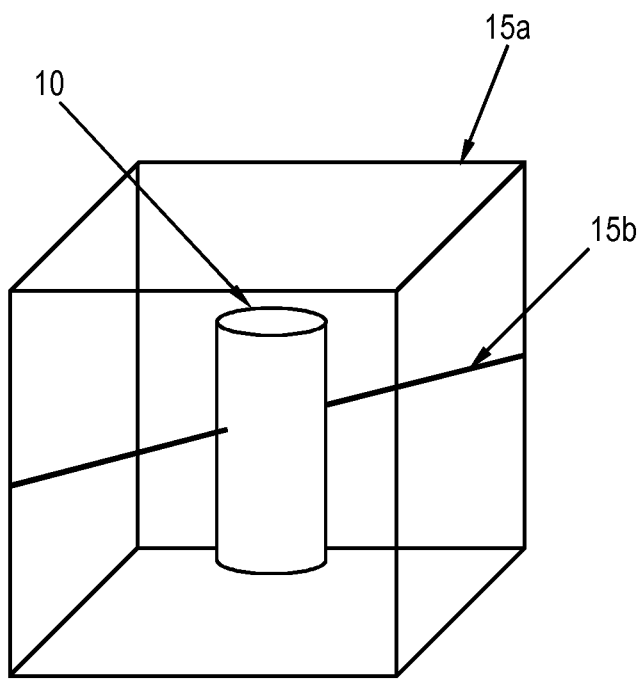
FIG. 5 shows an alternative embodiment of the lattice box shown in FIG. 4.

According to an embodiment of the invention, the rods of the lattice may also be omitted, if the holding pins 15b are fixed to the edges of the lattice box, as shown in FIG. 5.

The provision of a lattice box with holding pins arranged thereon and the use of spacers between the molded parts and the arrangement of the molded parts within the lattice box, as explained with reference to FIG. 4, provides the advantage that the molded parts 10 may be put into the processing chamber of the etching device in any arbitrary orientation, wherein at the same time it is ensured that the molded parts neither contact the bottom nor the sidewalls. Moreover, the entire lattice box with the molded parts arranged therein may be agitated, as for example by using an agitator, without the molded parts contacting the bottom or the sidewalls or the agitator.

The lattice box, moreover, ensures that during the etching process, independently of the etching process used, the etching agent is applied to the entire surface of the molded parts uniformly. Hereby, it is advantageous, if only that many lattice rods are provided, which are required for attaching the holding pins 15b at the lattice box.

The lattice boxes 15, the holding pins 15b, the spacers 15d, and the molded parts 10 arranged within the lattice box shown in FIG. 4 and FIG. 5, are formed integrally or in one piece, i.e., are produced or printed in an single printing process by means of a 3D printer.

The connection points between the holding pins 15b and the molded parts 10 or between the spacers 15d and the molded parts 10 may be configured as shown with reference to FIG. 3.

The spacers 15d may be detached from the molded parts by means of cutting. Alternatively, the spacers 15d may consist of a material being different from the material of the molded body such that the spacers may be detached by means of a separation means from the molded body, as explained with reference to FIG. 1.

The data set or the printing file described above with reference to FIG. 1, which is provided to a 3D printer, may further comprise instructions or information on the geometry of the spacers 15d. According to an embodiment of the invention, the CAD program or the 3D design/modeling program may be adapted to automatically create spacers on the basis of the geometry of the molded parts arranged within the lattice box, by means of which the molded parts are connected to each other with the spacing there between, and to add these to the data set. According to a further alternative embodiment, the 3D printer itself may be adapted to calculate suitable spacers for a data set, which only comprises information on the geometry of the molded parts, and to print these together with the molded parts.

In FIG. 4 and FIG. 5, lattice boxes 15a are shown respectively, which have the shape of a cuboid. However, all geometrical shapes are suitable, in particular, also spherical and cylindrical lattice boxes.

According to a specific embodiment of the invention, lattice boxes may also be provided, describing a substantially convex, preferably, minimally convex-shaped shell, in which several molded parts spaced apart from each other are enclosed.

FIG. 6 shows an embodiment according to which several molded parts 10 are arranged spaced apart from each other, and are connected to each other by means of spacers 15d. Here, a spacer is formed as a straight spacer, by means of which the two perpendicular molded parts are connected to each other. The other spacer is formed as a T-shaped spacer. The T-shaped spacer has three ends, where each end is connected to one of the three molded parts.

At the left one of the two perpendicular molded parts, moreover, two holding means or holding pins 15b are arranged being provided for arranging the compound formed by the molded body 10 and the spacer 15b in an etching device such that the molded bodies, during the etching process, neither contact the bottom nor the sidewalls. For example, the compound of the molded body 10 and the spacer 15d may be placed on the bottom of the etching device by means of the holding pins 15b.

In contrast to the embodiments shown in FIG. 4 and FIG. 5, no lattice box is provided in the embodiment shown in FIG. 6. Nevertheless, the several molded parts may be arranged in the etching device spaced apart from each other such that they do not contact the walls of the etching device.

In FIG. 4 and FIG. 6, spacers are shown, which have two or three ends, at which the molded bodies may be attached. Basically, spacers may be provided comprising n ends, in order to connect n molded parts to each other.

Figure 7:
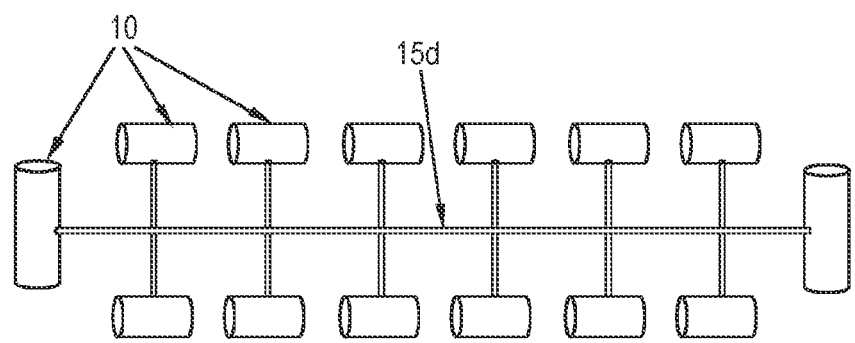
FIG. 7 shows a number of molded parts which are connected to each other by a spacer.
Figure 8:
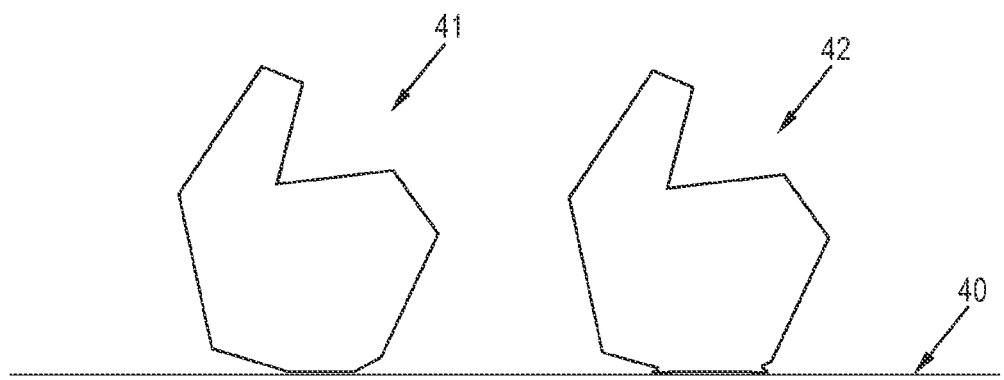
FIG. 8 shows a molded part, the surface of which is treated by means of a method known from prior art (before and after the surface treatment).

An example of a spacer 15d with a plurality of ends is shown in FIG. 7. The spacer 15d is configured substantially in the shape of a double-rake. At each end of the spacer 15d, a molded body 10 is arranged. Of course, different molded bodies may be connected to each other with the spacing in between by means of a spacer 15d.

In the example shown in FIG. 7, there is no lattice box provided. Never the less, the compound made from the molded body 10 and the spacer 15d shown in FIG. 7 may also be arranged within a lattice box, as shown, for example, with reference to FIG. 4.

The method for treating a surface of a molded part produced in a 3D printing process according to the method and the method for producing a molded part in a 3D printing process advantageously allow for the printed molded part being supplied to an etching process immediately without preparing measures having to be carried out at the molded part itself, or without measures in the processing chamber of the etching device having to be carried out, which prevent a contact of the bottom or the inner wall of the processing chamber by the molded part. The temporal expenditure for the smoothening of the surface of the molded part, thus, can be reduced substantially. In particular, the method for treating the surface of a molded part is suitable for the industrial production of molded parts.

REFERENCE NUMERALS 10 molded part (produced in a 3-D printing process)
11 recess or depression at the surface of the molded part
12 surface of the molded part 10
15 holding means
15a lattice box of the holding means
15b holding pins of the holding means
15c projecting end of the holding pin
15d spacer
20 predetermined breaking point
30 (imaginary) convex shell of the molded part 10
40 bottom
41 molded part before the etching process
42 molded part during or after the etching process

The invention claimed is:

1. A method for treating a surface of at least one molded part (10) produced in a 3D printing process by means of a surface treatment agent, wherein
at least one holding means (15) projecting from the surface of the molded part (10) is arranged at the surface (12),
the molded part with the at least one holding means (15) is put into a processing chamber having an inner wall formed by a bottom and side walls, of a processing device such that the surface (12) of the molded part (10) does not contact the inner wall,
the surface treatment agent is applied to the surface (12) of the molded part (10) after being placed in the processing chamber for a predetermined time period,
after the application of the surface treatment agent to the surface (12) of the molded part, the molded part (10) is removed from the processing chamber, and the holding means (15) are detached from the surface of the molded part,
the holding means (15) comprises a lattice box (15a), wherein the at least one molded part (10) is arranged within the lattice box such that at least one end of a holding pin (15b) is attached to the surface (12) of the molded part (10), and at least another end of the holding pin (15b) is attached to the wall of the lattice box, wherein the surface of the molded part does not contact the lattice box
the holding means (15) and the molded part (10) are formed in one piece, and/or are produced integrally in the 3D printing process.

2. The method of claim 1, wherein the application of the surface treatment agent to the surface (12) of the molded part (1) comprises a vapor deposition of the surface treatment agent onto the surface, a spraying of the surface treatment agent onto the surface, an immersion of the molded part into a liquid surface treatment agent, and combinations thereof.

3. The method of claim 1, wherein during the application of the surface treatment agent, the molded part (10) is moved in the processing chamber relative to the processing chamber.

4. The method of claim 1, wherein after the application of the surface treatment agent to the surface (12) of the molded part (10), the molded part is subjected to a cleaning, in order to remove excessive surface treatment agent present at the surface (12) of the molded part (10), wherein the molded part (10) is heated for cleaning, in order to detach the excessive surface treatment agent from the surface (12) of the molded part (10), and/or wherein the molded part (10) is heated before and/or during the application of the surface treatment agent to the surface (12), in order to reduce the treatment duration of the surface treatment.

5. The method of claim 1, wherein the holding means (15) comprises at least one holding pin (15b) having at least two ends, wherein at least one end of the holding pin is attached to the surface (12) of the molded part (10).

6. The method of claim 1, wherein the holding means (15) comprises at least one spacer (15d) having at least two ends, wherein several molded parts are arranged spaced apart from each other and not contacting each other, wherein the several molded parts are connected to each other via the at least one spacer (15d).

7. The method of claim 1, wherein the holding pin (15b) of the holding means (15) is arranged relative to the surface of the molded part such that the holding pin (15b) at least in sections lies outside of an imaginary convex shell (30) of the molded part.

8. The method of claim 1, wherein a predetermined breaking point is formed between the surface (12) of the molded part (10) and the holding means (15), at which the holding means is detachable from the surface of the molded part after the application of an etching means to the surface of the molded part.

9. The method of claim 1, wherein a minimum cross-sectional area of the holding means (15) at the portion facing the surface (12) of the molded part (10) is selected depending on the weight of the molded part, on the duration of the surface treatment, on the surface treatment agent used, on the production process, on the material used, and/or combination thereof.

10. The method of claim 1, wherein
the at least one molded part (10) comprises a first material or a first material composition, and the at least one holding means (15) comprises a second material or a second material composition,
for detaching the holding means (15) from the surface (12) of the molded part (10), a liquid separation means is applied at least to the holding means,
wherein the liquid separation means are selected such that the holding means are dissolved within a predetermined time period completely at least in parts without thereby modifying the molded part or the surface of the molded part.

11. The method of claim 10, wherein the molded part (10) is produced in a powder-based production or printing process, and wherein the first material or the first material composition is a first adhesive, and the second material or the second material composition is a second adhesive, and wherein the first adhesive is resistant against the separation means, and the second adhesive is non-resistant against the separation means.

12. The method of claim 1, wherein the surface treatment agent comprises an etching agent or a solvent.

13. A method for producing a molded part (1) in a 3D printing process, which has to be subjected to a surface treatment by means of a surface treatment agent after the production, wherein the molded part is produced together with at least one holding means (15) projecting from the surface (12) of the molded part (10), wherein the molded part and the at least one holding means are formed in one piece, and wherein the holding means is produced as a lattice box (15a) with at least one holding pin (15b), wherein the molded part (10) is produced within the lattice box, and wherein the molded part is attached to the lattice box by means of the at least one holding pin (15b), wherein the at least one holding pin is also produced in the 3D printing process such that the lattice box, the at least one holding pin, and the molded part are formed in one piece.

14. The method of claim 13, wherein the holding means projects at least partially beyond an imaginary convex shell (30) of the molded part (10).

15. The method of claim 13, wherein the holding means is produced as a spacer (15d), wherein the spacer connects at least two molded parts (10) spaced apart from each other, wherein the spacer is also produced in the 3D printing process such that the spacer and the molded parts are formed in one piece.

16. The method of claim 13, wherein for producing the molded part (10), a first material or a first material composition is used, and for producing the holding means (15), a second material or a second material composition is used, wherein the first material or the first material composition and the second material or the second material composition are selected such that the holding means are dissolvable by means of a liquid separation means within a predetermined time period completely, without thereby modifying the surface of the molded part.

* * * * *